United States Patent
Grover et al.

(10) Patent No.: US 10,025,643 B2
(45) Date of Patent: Jul. 17, 2018

(54) SYSTEM AND METHOD FOR COMPILER SUPPORT FOR KERNEL LAUNCHES IN DEVICE CODE

(71) Applicant: NVIDIA Corporation, Santa Clara, CA (US)

(72) Inventors: Vinod Grover, Mercer Island, WA (US); Jaydeep Marathe, San Jose, CA (US); Sean Lee, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 12 days.

(21) Appl. No.: 13/735,981

(22) Filed: Jan. 7, 2013

(65) Prior Publication Data

US 2013/0300752 A1 Nov. 14, 2013

Related U.S. Application Data

(60) Provisional application No. 61/645,515, filed on May 10, 2012.

(51) Int. Cl.
*G06F 9/45* (2006.01)
*G06F 9/54* (2006.01)
*G06F 8/41* (2018.01)
*G06F 9/48* (2006.01)

(52) U.S. Cl.
CPC ............ *G06F 9/54* (2013.01); *G06F 8/41* (2013.01); *G06F 9/4843* (2013.01)

(58) Field of Classification Search
CPC ..................................................... G06F 9/45
USPC .................................................. 717/136–155
See application file for complete search history.

(56) References Cited

U.S. PATENT DOCUMENTS

| | | | | |
|---|---|---|---|---|
| 8,296,743 B2* | 10/2012 | Linderman et al. | .......... | 717/140 |
| 8,375,368 B2* | 2/2013 | Tuck et al. | .................... | 717/130 |
| 8,443,348 B2* | 5/2013 | McGuire et al. | ............. | 717/146 |
| 8,448,156 B2* | 5/2013 | Demetriou | ................ | G06F 8/45 717/136 |
| 2003/0192036 A1* | 10/2003 | Karkare | .............. | G06F 11/3466 717/158 |
| 2007/0294663 A1* | 12/2007 | McGuire | ................... | G06F 8/45 717/108 |
| 2009/0322769 A1* | 12/2009 | Zhou | ......................... | G06F 8/31 345/522 |
| 2010/0122264 A1* | 5/2010 | Xiaocheng | .............. | G06F 9/544 719/312 |
| 2010/0138376 A1 | 6/2010 | Avis et al. | | |

(Continued)

OTHER PUBLICATIONS

Ueng, et al., "CUDA-lite: Reducing GPU programming complexity," Journal (2008) vol. (5335): pp. 10-24. Springer-Verlag Berlin Heidelberg.

*Primary Examiner* — Jae Jeon

(57) ABSTRACT

A system and method for compiling source code (e.g., with a compiler). The method includes accessing a portion of device source code and determining whether the portion of the device source code comprises a piece of work to be launched on a device from the device. The method further includes determining a plurality of application programming interface (API) calls based on the piece of work to be launched on the device and generating compiled code based on the plurality of API calls. The compiled code comprises a first portion operable to execute on a central processing unit (CPU) and a second portion operable to execute on the device (e.g., GPU).

15 Claims, 6 Drawing Sheets

(56) References Cited

U.S. PATENT DOCUMENTS

| | | |
|---|---|---|
| 2010/0153934 A1 | 6/2010 | Lachner |
| 2011/0078226 A1* | 3/2011 | Baskaran ................ G06F 17/16 708/607 |
| 2011/0264626 A1* | 10/2011 | Gautam ............ G06F 17/30445 707/626 |
| 2011/0314256 A1* | 12/2011 | Callahan, II .............. G06F 8/45 712/17 |
| 2011/0314444 A1* | 12/2011 | Zhang et al. ................. 717/106 |
| 2011/0314458 A1* | 12/2011 | Zhu ........................ G06F 8/314 717/149 |
| 2013/0036408 A1* | 2/2013 | Auerbach et al. ............ 717/140 |
| 2013/0036409 A1* | 2/2013 | Auerbach et al. ............ 717/140 |
| 2013/0160016 A1* | 6/2013 | Gummaraju .......... G06F 9/5044 718/102 |

* cited by examiner

SYSTEM AND METHOD FOR COMPILER SUPPORT FOR KERNEL LAUNCHES IN DEVICE CODE

RELATED U.S. APPLICATIONS

This application claims the benefit of and priority to the copending provisional patent application Ser. No. 61/645,515, entitled "SYSTEM AND METHOD FOR COMPILER SUPPORT FOR KERNEL LAUNCHES IN DEVICE CODE," with filing date May 10, 2012, and hereby incorporated by reference in its entirety.

FIELD OF THE INVENTION

Embodiments of the present invention are generally related to graphics processing units (GPUs) and compilers.

BACKGROUND OF THE INVENTION

As computer systems have advanced, graphics processing units (GPUs) have become increasingly advanced both in complexity and computing power. GPUs are thus used to handle processing of increasingly large and complex graphics. As a result of this increase in processing power, GPUs are now capable of executing both graphics processing and more general computing tasks. The ability to execute general computing tasks on a GPU has lead to increased development of programs that execute general computing tasks on a GPU and the corresponding need to be able to perform an increasing number of the complex programming tasks.

A general-purpose computing on graphics processing units (GPGPU) program executing general computing tasks on a GPU has a host portion executing on a central processing unit (CPU) and a device portion executing on the GPU. With conventional solutions, it is not possible to launch a piece of work ("kernel") on the GPU from code executing on the GPU. As a result, launching a kernel involves transferring significant amounts of data from the host memory to the GPU memory each time a new kernel is launched from the host or CPU side. For example, for kernels that are to be launched consecutively, the results from kernel launch are transferred from the GPU to host memory and then transferred from host memory to the GPU again when the next kernel is launched. The transferring of data between the GPU and CPU can be a very expensive operation. Further, irregular computation is not possible. For example, recursive algorithms, such as quick sort, cannot be performed from the GPU because the number of threads and other execution properties would not be available until an algorithm is executed.

SUMMARY OF THE INVENTION

Accordingly, what is needed is a solution to allow launching of a piece of work or kernel on a device (e.g., GPU) from the device (e.g., GPU) and corresponding compiler support. Embodiments of the present invention enable compiler support for launching a piece of work or "kernel" in device code thereby enabling iterative applications. Embodiments of the present invention are operable for mapping of kernel launch syntax to a code sequence involving calls to application programming interface (API) functions. Embodiments of the present invention advantageously utilize a reduced number of API calls for launching a kernel. Embodiments of the present invention further support checking accesses to private resources and checking the entity launched.

In one embodiment, the present invention is directed to a method for compiling source code (e.g., with a compiler). The method includes accessing a portion of device source code and determining whether the portion of the device source code comprises a piece of work to be launched on a device from the device. The method further includes determining a plurality of API calls based on the piece of work to be launched on the device and generating compiled code based on the plurality of API calls. The compiled code comprises a first portion operable to execute on a central processing unit (CPU) and a second portion operable to execute on the device (e.g., GPU). The generating complied code may comprise code for passing arguments of the piece of work to be launched on the device with a parameter buffer.

The method may further include determining whether the piece of work to be launched on the device accesses a resource that is private to the code that is launching the kernel, and generating an error, if so. In one embodiment, the private resource comprises memory local to a portion of work launching the piece of work to be launched. In one exemplary embodiment, the determining whether the piece of work to be launched on the device accesses a private resource comprises using data flow analysis. A "launchable function" is a function that is allowed to be the starting point of execution for a kernel or piece of work launch. The method may further include determining whether the piece of work to be launched on the device is not a launchable function and generating an error if the piece of work to be launched on the device is not a launchable function.

In one embodiment, the present invention is directed toward a system for compiling code. The system includes a code access module operable to access source code from a datastore, where the source code comprises a call to launch a piece of work on a device from the device. The system further includes a mapping module operable to map the call to launch the piece of work on the device from the device to an API call to launch the piece of work on the device from the device. The system further includes a compilation module operable to compile the source code into executable code. The executable code comprises a first portion operable to execute on a central processing unit (CPU) and a second portion operable to execute on the device (e.g., GPU). In one exemplary embodiment, the executable code comprises code for passing arguments of the piece of work to be launched on the device with a parameter buffer.

The system may further include a resource access module operable to determine whether the piece of work to be launched on the device from the device accesses a private resource. In one embodiment, the resource access module is operable to generate an error if the piece of work to be launched accesses a private resource. The system may further include a launch checking module operable to determine whether the call to launch the piece of work on the device from the device is calling a piece of work or launchable function. In one embodiment, the launch checking module is operable to generate an error if the call to launch a piece of work on the device from the device calls a non-launchable function.

In another embodiment, the present invention is implemented as a method for compiling code. The method includes accessing a line of source code comprising a call to launch a piece of work on a graphics processor from the graphics processor and determining whether the call to launch the piece of work on the graphics processor from the graphics processor comprises arguments. The method further includes evaluating arguments of the call to launch the piece of work on the graphics processor from the graphics processor and generating a first code portion for allocating a parameter buffer. The method further includes generating a second code portion for storing the arguments into the parameter buffer and generating compiled code for launching the piece of work on the graphics processor from the graphics processor based on the first code portion and the second code portion. In one embodiment, the generating compiled code for launching the piece of work on the graphics processor from the graphics processor comprises using an API call.

The method may further include determining whether the piece of work to be launched on the graphics processor from the graphics processor accesses a private resource and generating an error if the piece of work to be launched on the graphics processor from the graphics processor accesses a private resource. In one exemplary embodiment, the private resource comprises memory local to the line of the source code comprising the call to launch the piece of work on a graphics processor from the graphics processor. The determining of whether the piece of work to be launched on the graphics processor accesses a private resource comprises using an analysis of a store instruction. The method may further include determining whether the piece of work to be launched on the graphics processor from the graphics processor is not a launchable function and generating an error if so.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
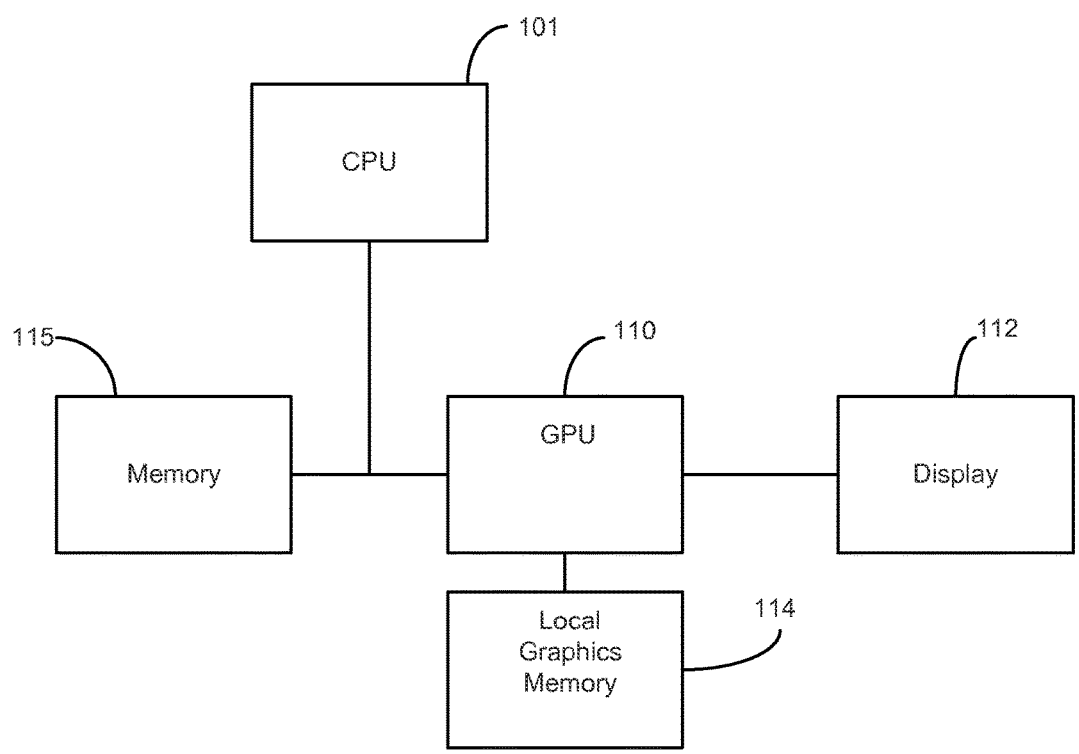
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

In one exemplary embodiment, GPU 110 is operable for general-purpose computing on graphics processing units (GPGPU) computing. General-purpose computing on graphics processing units (GPGPU) programs or applications may be designed or written with the Compute Unified Device Architecture (CUDA) framework and Open Computing Language (OpenCL) framework. GPU 110 may execute Compute Unified Device Architecture (CUDA) programs and Open Computing Language (OpenCL) programs. It is appreciated that the parallel architecture of GPU 110 may have significant performance advantages over CPU 101.

Exemplary Systems and Methods for Compiler Support for Kernel Launches in Device Code Embodiments of the present invention enable compiler support for launching a piece of work or "kernel" in device code thereby enabling iterative applications. Embodiments of the present invention are operable for mapping of kernel launch syntax to a code sequence involving calls to application programming interface (API) functions. Embodiments of the present invention advantageously utilize a reduced number of API calls for launching a kernel. Embodiments of the present invention further support checking accesses to private resources and checking the entity launched.

Embodiments of the present invention may be operable for correctness checks for references to private resources incorrectly passed to the kernel being launched. Embodiments of the present invention may be operable for correctness checks on the entity being launched.

With reference to FIGS. 2-5, flowcharts 200-500 illustrate example functions used by various embodiments of the present invention. Although specific function blocks ("blocks") are disclosed in flowcharts 200-500, such steps are examples. That is, embodiments are well suited to performing various other blocks or variations of the blocks recited in flowcharts 200-500. It is appreciated that the blocks in flowcharts 200-500 may be performed in an order different than presented, and that not all of the blocks in flowcharts 200-500 may be performed.

Figure 2:
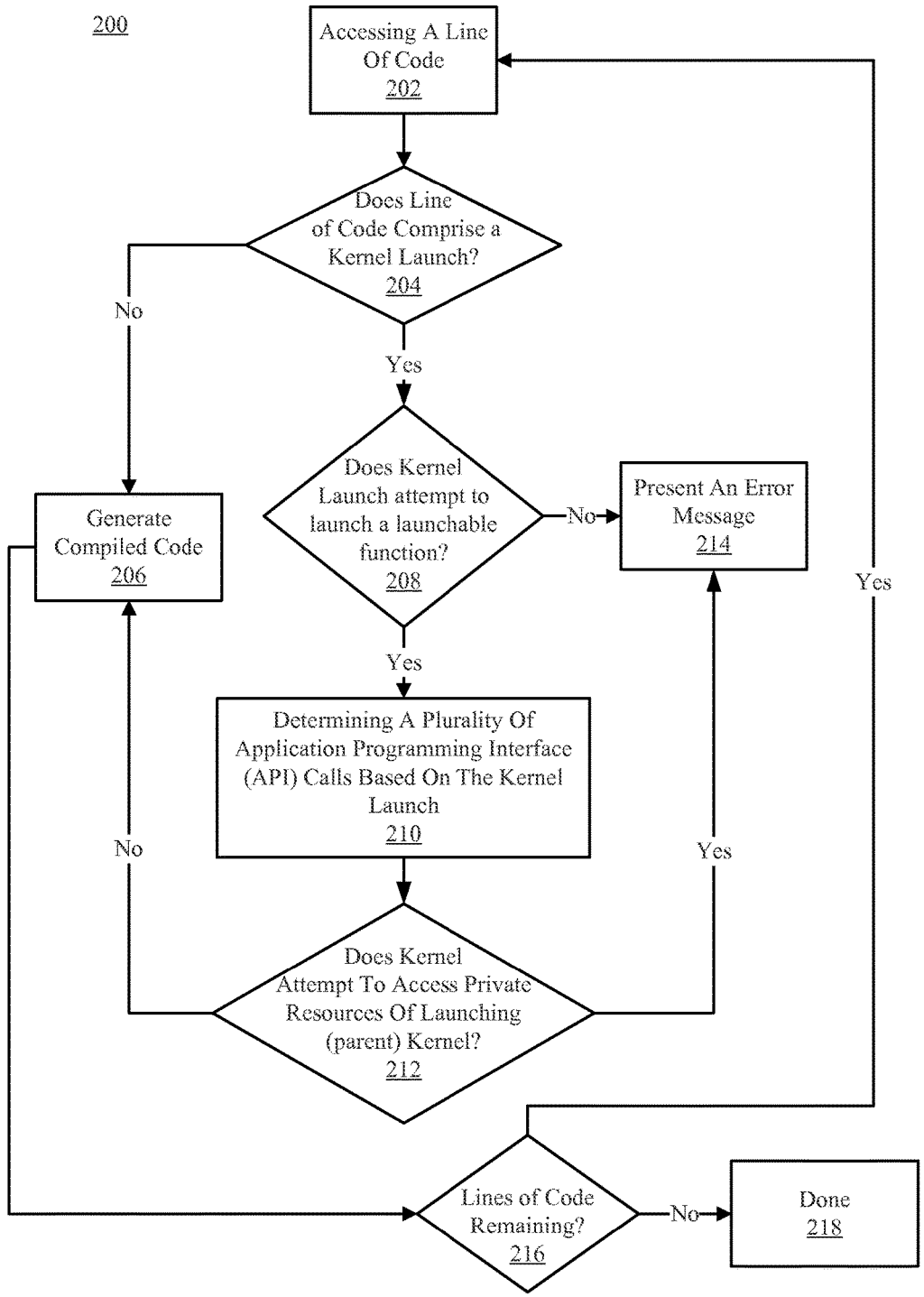
FIG. 2 shows a flowchart of an exemplary computer controlled process for processing a source file (e.g., by a compiler) in accordance with one embodiment of the present invention.

FIG. 2 shows a flowchart of an exemplary computer controlled process for processing a source file (e.g., by a compiler) in accordance with one embodiment. Embodiments of the present invention support launching work dynamically from a device (e.g., GPU). FIG. 2 depicts a process 200 for compiling source code to generate executable code where a first portion is executable a CPU and a second portion is executable on a device (e.g., GPU). The compiled executable code for the device may comprise a kernel launch (e.g., launch of work for the device from the device code). Embodiments of the present invention further facilitate iterative applications to be executed by a device (e.g., a GPU). It is appreciated that additional blocks of a compilation process may be performed in conjunction with process 200 beyond those shown.

At block 202, a line of code is accessed (e.g., a portion of device source code). The line of code may be source code of an application for execution on a host (e.g., CPU) and a device (e.g., GPU) or other heterogeneous programming environment.

At block 204, whether a line of code comprises a kernel launch is determined. In one exemplary embodiment, whether a portion of device source code comprises a piece of work to be launched (kernel) on a device from the device (e.g., GPU) is determined by a compiler.

In one embodiment, a kernel launch is identified by a triple angle bracket syntax (e.g., <<< >>>) and allows arguments to be specified in the kernel launch. In one embodiment, the number of threads per thread block and number of thread blocks can be specified. If the line of code comprises a kernel launch, block 208 is performed. If the line of code does not comprise a kernel launch, block 206 is performed.

At block 206, compiled code is generated (e.g., by a compiler) for execution on a device (e.g., a GPU) and/or host (e.g., CPU). The compiled code may be generated based on the plurality of API calls. The complied code may comprise compiled code for passing arguments of the piece of work to be launched on the device with a parameter buffer thereby reducing the number of API calls. In one embodiment, the compiled code comprises a first portion operable for execution on a central processing unit (CPU) and a second portion operable for execution on the device (e.g., GPU).

At block 208, whether the kernel launch attempts to launch a launchable function is determined. A "launchable function" is a function that is launchable as a piece of work or kernel and can be denoted in the program specification (e.g., _global_annotation) as the starting point of execution for the kernel launch. In one embodiment, functions that are not denoted in the program specification or code as launchable (e.g., an annotation other than _global_) may not be launched. In one embodiment, a pointer argument of the kernel launch is checked to determine whether the pointer points to a launchable function or other entity (e.g., process 500). In one exemplary embodiment, an argument of the kernel launch device API is checked to determine whether the argument comprises a pointer to a launchable function. For example, data flow analysis may be performed to determine where the pointer originates from. Block 214 may be performed and an error generated when the entity being launched is not a launchable function. Block 210 may be performed if the entity being launched is a launchable function.

At block 210, a plurality of application programming interface (API) calls based on the kernel launch are determined (e.g., process 300). The API calls may be determined based on the kernel to be launched on the device. In one embodiment, the plurality of API calls may be determined, as described herein, with respect to mapping launch syntax to CUDA Runtime API. The kernel call may be transformed into a plurality of API calls to be executed on the device (e.g., GPU).

In one embodiment, a parameter buffer is accessed to fill a parameter buffer of the device and thereby filling the parameter buffer of the kernel to be launched via a device API call. This may be via a single API call thereby reducing the number of API calls to launch a kernel. Conventional solutions when launching a kernel from the host (e.g., CPU) side typically make an API call for each argument to a kernel.

At block 212, whether the kernel attempts to access private resources of the launching or parent kernel is determined (e.g., process 400). In one embodiment, private resources may be private resources of kernel on a device including, but not limited to, shared memory, local memory, or a texture of a GPU. Kernel launches may pass a pointer to memory without specifying whether the memory is shared memory, local memory, or global memory (e.g., global memory of a GPU). In one embodiment, data flow analysis (e.g., of a store instruction) is used for determining whether the kernel to be launched on the device (e.g., GPU) accesses a private resource. If a pointer is passed to global memory (e.g., global memory of a GPU) in the kernel launch, an error may not be presented and block 206 may be performed. If a pointer is passed to shared memory or local memory in the kernel launch (e.g., a pointer to shared or local memory local to a portion of work launching the kernel), block 214 may be performed.

In one exemplary embodiment, assignment operations (e.g., store instructions) are checked to see if an argument in the parameter buffer is pointing to shared or local memory. The determination may be based on performing correctness checks for private resources, as described herein. In one embodiment, data flow analysis is used to determine whether a value that has been assigned to the parameter buffer is derived from a pointer that points to shared or local memory. It is appreciated that the pointer may be an address of shared memory plus an offset or an array index computation done on a shared memory pointer, etc.

At block 214, an error message is presented. The error message may be an error from a compiler indicating that the entity being launched did not denote a launchable function and/or that there was an attempt to access private resources from the kernel launch.

At block 216, whether any lines of code remain to be compiled is determined. If there are remaining lines of code to be compiled, block 202 is performed. If there are no more lines of code to be compiled, block 218 is performed.

At block 218, compilation is done and an executable may be generated. In one embodiment, any warnings based on the source code may be presented.

It is noted that although embodiments are described in the context of and with example in the CUDA programming environment, embodiments of the present invention are applicable to other heterogeneous programming environments that provide similar mechanisms to launch new work and have constraints on resource sharing between the launching context (e.g., parent) and the launched context (e.g., child).

Figure 3:
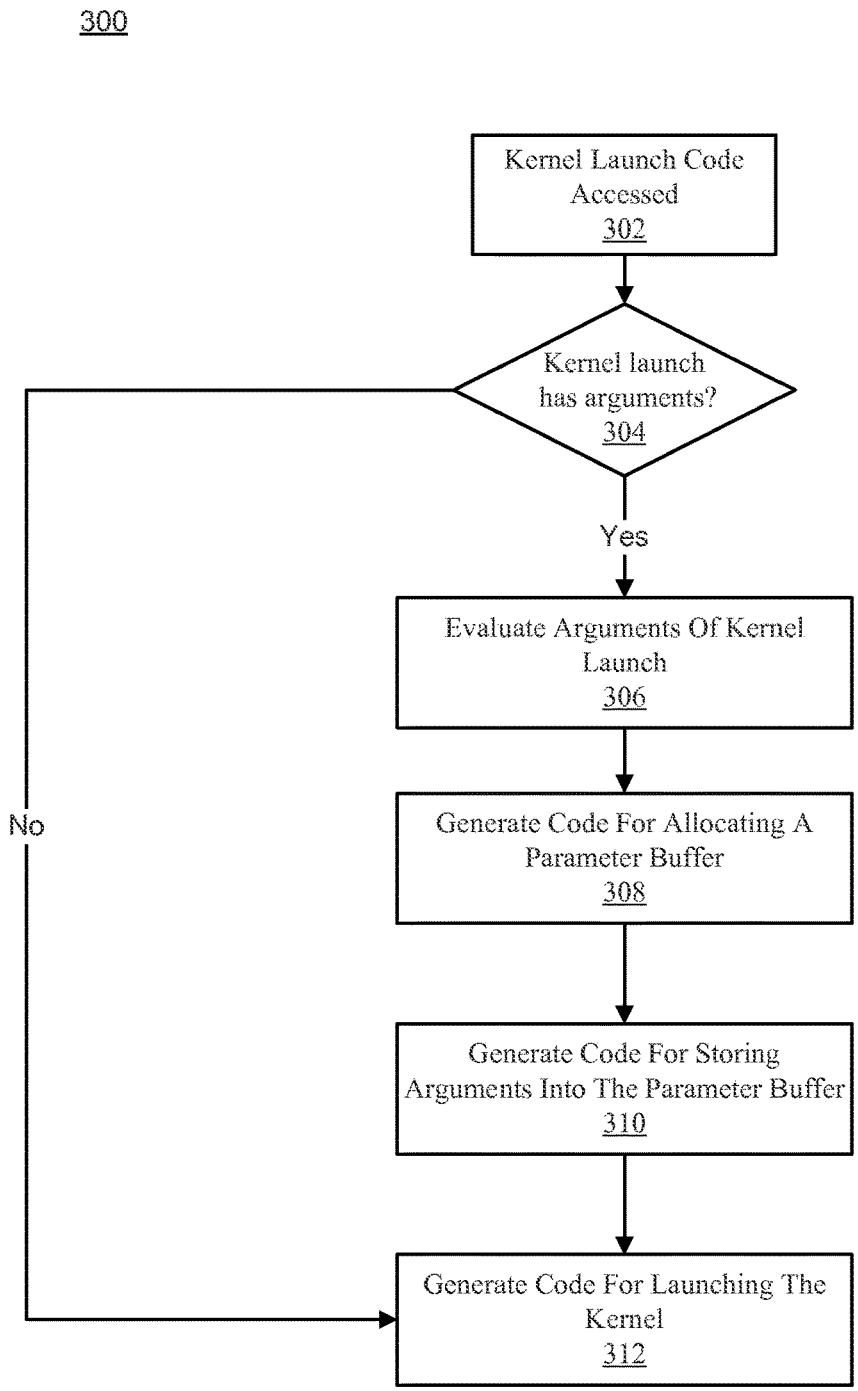
FIG. 3 shows an exemplary computer controlled process for mapping source code to a kernel launch code sequence in accordance with one embodiment of the present invention.

FIG. 3 shows an exemplary computer controlled process for mapping source code to a launch sequence in accordance with one embodiment. FIG. 3 depicts a process 300 for mapping launch syntax to one or more API calls (e.g., by a compiler). Process 300 may be performed during compilation (e.g., block 210).

It is noted that Compute Unified Device Architecture (CUDA) is a heterogeneous programming environment. Some CUDA-capable GPUs support launching work ("kernels") on the GPU from code running on the GPU. A kernel is a unit of work to be executed by a device (e.g., a GPU). In one exemplary embodiment, the CUDA runtime API (CUDART) specifies certain API functions for launching kernels from device code.

In one exemplary embodiment, the CUDA language provides a higher abstraction for launching kernels, rather than calling CUDART API functions explicitly. A kernel function may be launched using the launch syntax below, from both host and device code.

An exemplary kernel launch code:

```
kernel<<<dimension and size of the launch grid,
        dimension and size of each thread block,
        size of dynamically allocated shared memory,
        associated stream>>>
        (kernel arguments separated by commas);
```

It is noted that kernel launch code is substantially similar to function call code with arguments or parameters. Further, when launching a kernel, the number of threads in a thread block and number of thread blocks is specified.

In one embodiment, triple angle brackets (e.g., <<< >>>) are used to specify a kernel launch. The triple angle brackets are expanded during compilation into a series of API calls (e.g., CUDA API calls) thereby making the code compliable by an American National Standards Institute (ANSI) compiler.

An exemplary "implicit kernel launch" can be defined as:

```
E.g.:
_global_ void k( );                        /* kernel function       */
_device_ void d( ) { k<<<1,1>>>( ); }      /* launch from device    */
                                              code
_host_   void h( ) { k<<<1,1>>>( ); }      /* launch from host code */
```

Embodiments of the present invention are operable for compiler transformations for supporting an implicit kernel launch from within device code (e.g. the function d( ) above).

Referring to FIG. 3, at block 302, a line of code comprising a kernel launch is accessed. In one embodiment, a line of source code comprising a call to launch a kernel (or piece of work) on a GPU from the GPU is accessed.

At block 304, whether the kernel launch has any arguments is determined. In one exemplary embodiment, whether a call to launch a kernel on a GPU from the GPU comprises arguments is determined. If the kernel launch has any arguments, block 306 is performed. If the kernel launch does not have any arguments, block 312 is performed.

At block 306, the arguments of the kernel launch are evaluated.

At block 308, code for allocating a parameter buffer is generated. In one embodiment, code for allocating a parameter buffer by calling an API function (e.g., CUDART API function) is generated.

At block 310, code for storing the arguments into the parameter buffer is generated. In one embodiment, code for storing the arguments into the parameter buffer is generated if block 308 is performed successfully.

At block 312, code for launching the kernel is generated. In one exemplary embodiment, the code for launch may be compiled based on the code generated for allocating a parameter buffer and the code for storing arguments into the parameter buffer. In one embodiment, the code for launching the kernel comprises launching the kernel using a launch API. In one embodiment, the CUDART API function cudaGetParameterBuffer is used to acquire the allocated parameter buffer and cudaLaunchDevice is used as the launch API. In one embodiment, the parameter buffer is provided by a driver (e.g., CUDA driver). For example,

```
kernel<<<dimGrid, dimBlock, smemSize, stream>>>
       (arg0, arg1, ..., argn);
``` is mapped to

```
char *_T20;
...
/* Get the parameter buffer */
(_T20 = ((char *)(cudaGetParameterBuffer(parameter buffer alignment,
                                         parameter buffer size))) ?
( /* Fill the parameter buffer */
  *((arg0_type *) ((void *) _T20))) = arg0,
  *((arg1_type *) ((void *) (_T20 + arg1 offSet))) = arg1,
  ...
  *((argn_type *) ((void *) (_T20 + argn offset))) = argn,
  /* Launch the kernel */
  ((void) (cudaLaunchDevice((void *)&kernel, (void *)_T20,
                            dimGrid, dimBlock, smemSize, stream)))) :
  ((void)0);
```

It is appreciated that a ternary expression statement is generated, rather than a compound statement that comprises multiple expression statements as the kernel launch in the original form is a single expression statement. In one embodiment, the compiler may ensure that the type, to which the ternary expression is evaluated, is void, as kernels in CUDA may be required to have void as the return type. The ternary expression may be structured in the way that the runtime API cudaLaunchDevice is called only after the parameter buffer is configured correctly.

It is noted that in device code (e.g., that will execute on the GPU), calls to driver APIs can be particularly expensive (e.g., in terms of time and resources). Embodiments of the present invention may utilize one parameter buffer thereby minimizing the number of API (e.g., CUDA driver API) calls. Embodiments of the present invention may obtain a single parameter buffer via a first API call and then send a completed parameter buffer to the kernel launch API (e.g., CUDA launch device API). In another embodiment, a plurality of API calls is used to pass multiple arguments. It is noted that it is more efficient to pass a parameter buffer with a single API call (e.g., by having a reduced number of API calls).

For example, where the kernel does not take any arguments, kernel<<<dimGrid, dimBlock, smemSize, stream>>>( );

is mapped to:

```
/* Launch the kernel */
((void) (cudaLaunchDevice ((void *)&kernel, (void *) 0,
                           dimGrid, dimBlock, smemSize, stream));
```

Figure 4:
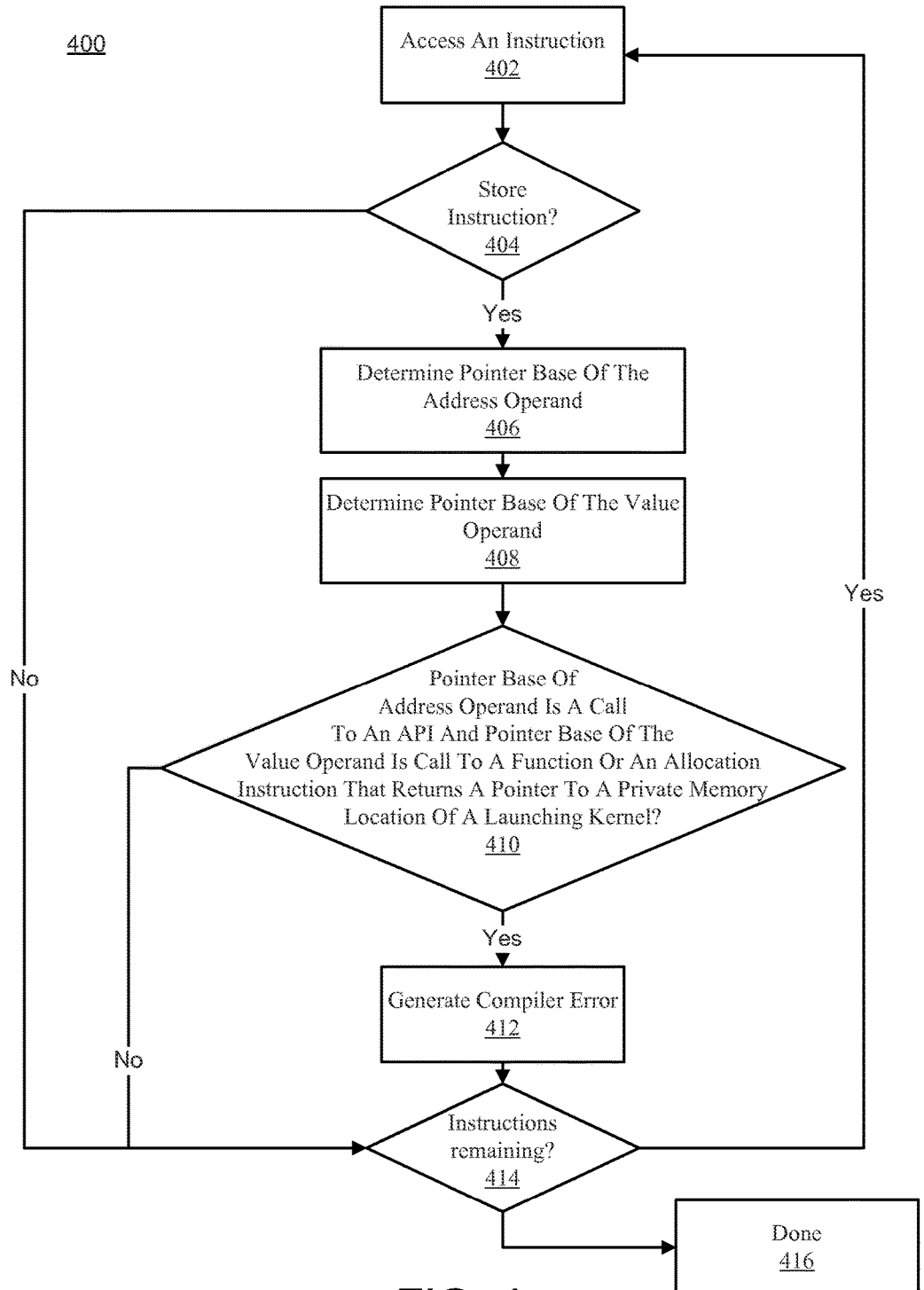
FIG. 4 shows a flowchart of an exemplary computer controlled process for determining whether a kernel attempts to access private resources in accordance with one embodiment of the present invention.

FIG. 4 shows a flowchart of an exemplary computer controlled process for determining whether a kernel attempts to access private resources in accordance with one embodiment of the present invention. A GPGPU framework may have several different types of memory including host memory corresponding to the CPU (e.g., RAM), global memory on the GPU which is accessible from the host and also across kernel launches and is persistent. A launching context or kernel may further have shared memory and local memory which are private resources to the launching context. Certain memory locations (e.g., CUDA _shared_and local memory locations) from the launching device context (e.g., "parent") cannot be safely accessed in a launched kernel (e.g., "child"). In one embodiment, kernel arguments comprise pointers which do not specify whether the memory is shared, local, or global. Embodiments of the present invention support checking and determining if any type of resource of a kernel to be launched is private (e.g., a texture, data structure, hardware representative handle).

FIG. 4 depicts a process 400 for checking (e.g., by a compiler) addresses of memory locations (e.g., _shared_and local locations) being passed from a launching kernel (e.g., "parent") to a launched kernel (e.g., "child") as arguments. Process 400 may be performed during compilation (e.g., block 212). Generally speaking, in one embodiment, store operations into a parameter buffer are examined and if a pointer is being stored in the parameter buffer, whether the pointer points to shared or local memory is determined.

At block 402, an instruction of a line of code is accessed.

At block 404, whether the instruction is a store instruction is determined. If the instruction is a store instruction, block 406 is performed. If the instruction is not a store instruction, block 414 is performed.

At block 406, the pointer base of the address operand is determined. In one embodiment, the pointer base of the address operand is determined with data flow analysis (e.g., of the device code) of the launching context (e.g., "parent").

At block 408, the pointer base of the value operand is determined. In one embodiment, the pointer base of the value operand is determined with data flow analysis (e.g., of the device code) of the launching context (e.g., "parent").

At block 410, whether the pointer base of the address operand is a call to an API function (e.g., CUDART API function) for allocating the parameter buffer and the pointer base of the value operand is a call to a function or an allocation instruction that returns a pointer to a private memory location (e.g., local or _shared_memory) (e.g., only accessible by) the launching kernel (e.g., "parent") is determined. If the pointer base of the address operand is a call to an API function (e.g., CUDART API function) for allocating the parameter buffer and the pointer base of the value operand is a call to a function or an allocation instruction that returns a pointer to a private memory location (e.g., local or _shared_memory) (e.g., only accessible by) the launching kernel (e.g., "parent"), block 412 is performed. For example, if an address points that to local memory plus an offset is assigned to the parameter buffer that would result in block 412 being performed. It is noted that errors may not be generated if the memory pointed to is global memory. Otherwise, block 414 is performed (e.g., if global memory is pointed to).

In one embodiment, data flow analysis is used to determine if the parameter buffer is actually being used by an actual API kernel device launch call or if the API kernel device launch call uses a parameter buffer with illegal arguments (e.g., shared or local memory).

At block 412, a compilation error is generated.

At block 414, whether instructions are remaining is determined (e.g., instructions from a line of code). If instructions are remaining, block 402 is performed. If no instructions remain, block 416 is performed.

At block 416, the checking of instructions is complete (e.g., for a line of code).

Figure 5:
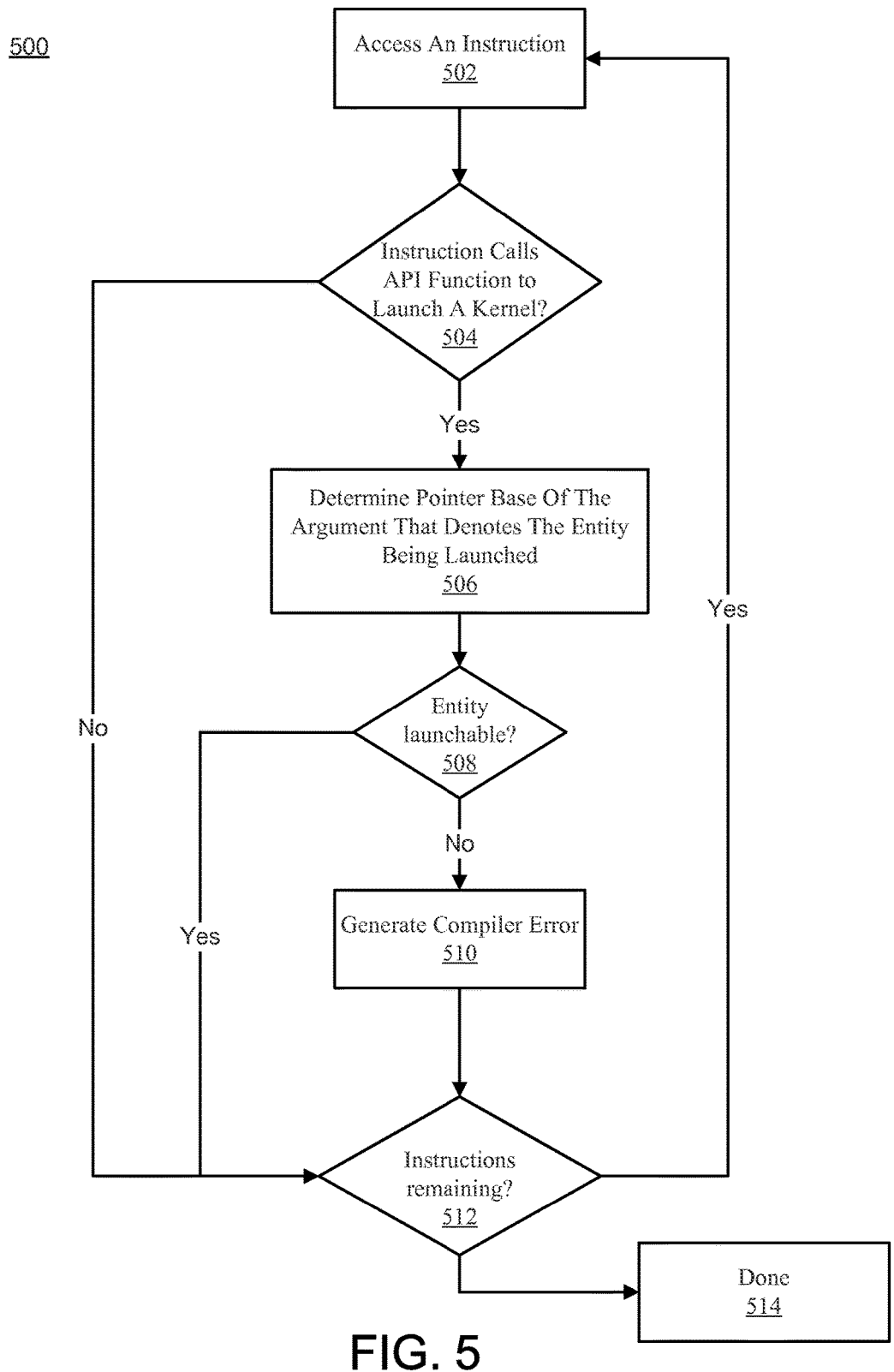
FIG. 5 shows an exemplary computer controlled process for determining whether a kernel is called in accordance with one embodiment of the present invention.

FIG. 5 shows an exemplary computer controlled process for checking whether a kernel is called in accordance with one embodiment. FIG. 5 depicts a process 500 for checking whether the entity being called is actually a kernel or some other entity (e.g., a function). For example, in the CUDA source language, a function that can be launched (e.g., a launchable function) can be marked with a specific annotation (e.g., "_global_") and a function without the specific annotation cannot be launched. Process 500 may be performed when a check is made as to whether the entity being launched is a launchable function (e.g., block 208) during compilation. For example, process 500 may check if a line of source code is attempting to launch a function that is not launchable.

At block 502, an instruction of a line of code is accessed.

At block 504, whether the device source code comprises a call instruction in the device source code that calls an API function to launch a kernel is determined. In one embodiment, the call instruction in the device source code calls the CUDART API function to launch a kernel. If the call instruction in the device source code comprises a call to an API function to launch a kernel, block 506 is performed. If the call instruction in the device source code does not comprise a call to an API function to launch a kernel, block 512 is performed.

At block 506, the pointer base of the argument that denotes the entity being launched is determined. The entity may be a pointer which may point to a kernel or a function. In one embodiment, the pointer base of an argument that denotes the entity being launched is determined using data flow analysis.

At block 508, whether the entity is launchable is determined. In one embodiment, the entity is determined to not be launchable if the "_global_" annotation is not present. For example, if the entity is a pointer to a kernel, the kernel can be launched. In contrast, if the entity is a pointer to a function (e.g., without "_global_" annotation), the function cannot be launched. If the entity is determined to be launchable, block 512 is performed. If the entity is determined to not be launchable, block 510 is performed.

At block 510, a compilation error is generated. The error message may be presented with other error messages by a compiler.

At block 512, whether instructions are remaining is determined (e.g., instructions from a line of code). If instructions are remaining, block 502 is performed. If no instructions remain, block 514 is performed.

At block 514, the checking of instructions is complete (e.g., for a line of code).

Figure 6:
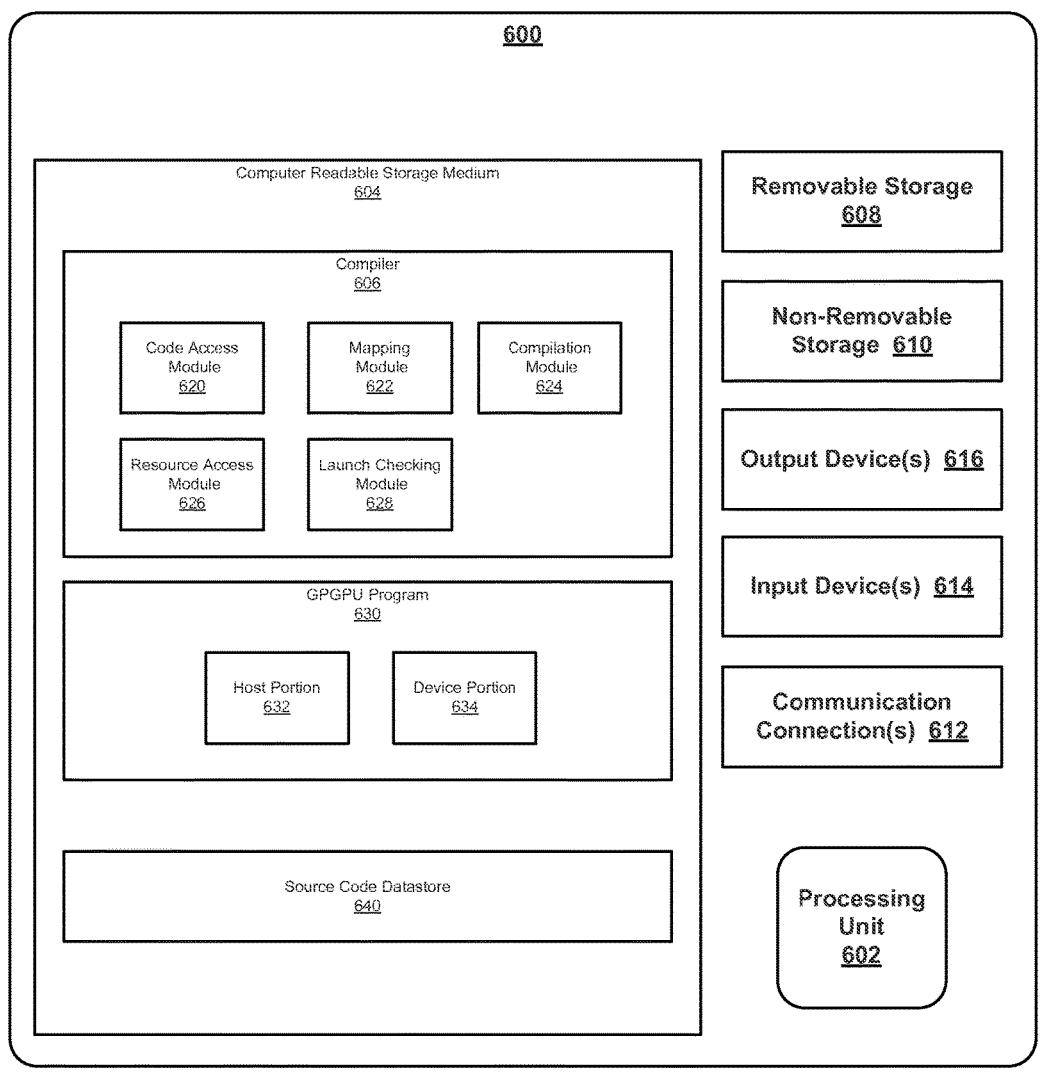
FIG. 6 shows a block diagram of exemplary computer system and corresponding modules, in accordance with one embodiment of the present invention.

FIG. 6 illustrates exemplary components used by various embodiments of the present invention. Although specific components are disclosed in computing system environment 600, it should be appreciated that such components are examples. That is, embodiments of the present invention are well suited to having various other components or variations of the components recited in computing system environment 600. It is appreciated that the components in computing system environment 600 may operate with other components than those presented, and that not all of the components of system 600 may be required to achieve the goals of computing system environment 600.

FIG. 6 shows a block diagram of exemplary computer system and corresponding modules, in accordance with one embodiment of the present invention. With reference to FIG. 6, an exemplary system module for implementing embodiments includes a general purpose computing system environment, such as computing system environment 600. Computing system environment 600 may include, but is not limited to, servers, desktop computers, laptops, tablet PCs, mobile devices, and smartphones. In its most basic configuration, computing system environment 600 typically includes at least one processing unit 602 and computer readable storage medium 604. Depending on the exact configuration and type of computing system environment, computer readable storage medium 604 may be volatile (such as RAM), non-volatile (such as ROM, flash memory, etc.) or some combination of the two. Portions of computer readable storage medium 604 when executed perform compilation of code for a GPGPU program (e.g., processes 200-500).

Additionally, computing system environment 600 may also have additional features/functionality. For example, computing system environment 600 may also include additional storage (removable and/or non-removable) including, but not limited to, magnetic or optical disks or tape. Such additional storage is illustrated in FIG. 10 by removable storage 608 and non-removable storage 610. Computer storage media includes volatile and nonvolatile, removable and non-removable media implemented in any method or technology for storage of information such as computer readable instructions, data structures, program modules or other data. Computer readable medium 604, removable storage 608 and nonremovable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 600. Any such computer storage media may be part of computing system environment 600.

Computing system environment 600 may also contain communications connection(s) 612 that allow it to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 612 may allow computing system environment 600 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 612 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 600 may also have input device(s) 614 such as a keyboard, mouse, pen, voice input device, touch input device, remote control, etc. Output device(s) 616 such as a display, speakers, etc. may also be included. All these devices are well known in the art and are not discussed at length.

In one embodiment, computer readable storage medium 604 includes compiler 606, GPGPU program 630, and source code datastore 640. Source code datastore (e.g., file, repository, etc.) may comprise source code for a GPGPU program having a host (e.g., CPU) portion 632 and device (e.g., GPU) portion 634. Host portion 632 is operable to executed on a CPU and device portion 634 is operable to execute on a GPU. GPGPU program 630 is output by compiler 606 after compiling source code from source code data store 640. It is noted that the modules and components of computer readable storage medium 604 may also be implemented in hardware.

Compiler 606 is a system for compiling code (e.g., source code from source code datastore 640). Compiler 606 includes code access module 620, mapping module 622, compilation module 624, resource access module 626, and launch checking module 628.

In one embodiment, code access module 620 is operable to access source code from a datastore and the source code comprises a call to launch a kernel or piece of work on a device from the device (e.g., GPU). Mapping module 622 is operable to map the call to launch kernel on the device from the device to an API call to launch the kernel on the device from the device (e.g., process 300), as described herein. Compilation module 624 is operable to compile the source code into executable code. In one exemplary embodiment, the executable code comprises a first portion operable to execute on a central processing unit (CPU) and a second portion operable to execute on the device (e.g., GPU). The executable code may comprise code for passing arguments of the kernel to be launched on the device with a parameter buffer, as described herein.

Resource access module 626 is operable to determine whether the kernel to be launched on the device from the device accesses a private resource (e.g., process 400), as described herein. In one embodiment, resource access module 626 is operable to generate an error if the piece of work to be launched accesses a private resource.

Launch checking module 628 operable to determine whether the call to launch the kernel on the device from the device is launching a launchable function kernel (e.g., process 500), as described herein. In one embodiment, launch checking module 628 is operable to generate an error if the call to launch a kernel on the device from the device attempts to launch a function that is not a launchable function.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of compiling source code, said method comprising:

accessing a portion of device source code from a file comprising device source code and host source code, wherein said device source code is distinguished from said host source code based on a pre-determined syntax associated with said device source code;

determining whether said portion of said device source code comprises kernel to be launched on a device from said device, wherein said device is a graphics processing unit (GPU), and wherein a number of threads in a thread block and a number of thread blocks are specified when the kernel is launched;

determining a plurality of application programming interface (API) calls based on said kernel be launched on said device;

determining whether said kernel to be launched on said device accesses a private resource; and generating compiled code based on said plurality of API calls, wherein a first portion of said compiled code is operable to execute on a central processing unit (CPU) and a second portion of said compiled code is operable to execute on said device, wherein said second portion of said compiled code is operable to launch said kernel on said device from said device.

2. The method as described in claim 1 further comprising: generating an error if said kernel to be launched on said device accesses a private resource.

3. The method as described in claim 2 wherein said private resource comprises memory local to a portion of work launching said kernel to be launched.

4. The method as described in claim 1, further comprising: generating an error if said kernel to be launched on said device is not a launchable function.

5. The method as described in claim 1, wherein said generating complied code comprises passing arguments of said kernel to be launched on said device with a parameter buffer.

6. The method as described in claim 1, wherein said determining whether said portion of said device source code comprises a kernel to be launched on a device from said device further comprises: using a compiler to determine whether said portion of said device source code comprises said kernel to be launched.

7. A system for compiling code, said system comprising: a processor; a memory coupled to said processor, said memory comprising computer-executable instructions that, when executed by said processor, cause said system to perform operations comprising:

accessing source code from a datastore, wherein said source code comprises a launch call operable to launch a kernel on a device from said device, wherein said source code comprises host source code and device source code, wherein said device source code is distinguished from said host source code based on a predetermined syntax associated with said device source code;

determining whether said portion of said device source code comprises kernel to be launched on a device from said device, wherein said device is a graphics processing unit (GPU), and wherein a number of threads in a thread block and a number of thread blocks are specified when the kernel is launched.

determining a plurality of application programming interface (API) calls based on said kernel to be launched on said device:

mapping said launch call operable to launch said kernel on said device from said device to an API call to launch said kernel on said device from said device;

determining whether said kernel to be launched on said device accesses a private resource; and compiling said source code into executable code, wherein a first portion of said executable, code is operable to execute on a central processing Unit (CPU) and a second portion of said executable code is operable to execute on said device, wherein said second portion of said executable code is operable to launch said kernel on said device from said device.

8. The system as described in claim 7, wherein said determining further comprises generating an error if said kernel to be launched accesses a private resource.

9. The system as described in claim 7, further comprising: determining whether said launch call operable to launch said kernel on said device from sad device is attempting to launch the launchable function.

10. The system as described in claim 9, wherein said determining further comprises generating an error if said launch call operable to launch said kernel on said device from said device is attempting to launch a function that is not a launchable function.

11. The system as described in claim 7, wherein said executable code comprises code for passing arguments of said kernel to be launched on said device with a parameter buffer.

12. A method for compiling code comprising:

accessing a line of source code from a file comprising device source code and host source code, wherein said device source code comprises a launch call operable to launch a kernel on a graphics processor from said graphics processor, wherein said device source code is distinguished from said host source code based on a pre-determined syntax associated with said device source code;

determining whether said launch call operable to launch said kernel on said graphics processor from said graphics processor comprises arguments, and wherein a number of threads in a thread block and a number of thread blocks are specified when the kernel is launched;

determining a plurality of application programming interface (API) calls based on said kernel to be launched on said graphics processor:

evaluating arguments of said launch call operable to launch said kernel on said graphics processor from said graphics processor;

generating a first code portion for allocating a parameter buffer:

generating a second code portion for storing said arguments into said parameter buffer;

determining whether said kernel to be launched on said graphics processor accesses a private resource; and generating compiled code for launching said kernel on sad graphics processor from said graphics processor based on said first code portion and sad second code portion, wherein said second code portion is operable to launch said kernel on said graphics processor from said graphics processor, wherein said generating compiled code for launching said kernel on said graphics processor from said graphics processor comprises using an API call.

13. The method as described in claim 12, further comprising: generating an error if said kernel to be launched on said graphics processor from said graphics processor accesses a private resource.

14. The method as described in claim 13, wherein said private resource comprises memory local to said line of said source code comprising said launch call operable to launch said kernel on a graphics processor from said graphics processor.

15. The method as described in claim 12, further comprising: determining whether sad kernel to be launched on said graphic s processor from said graphics processor is the launchable function; and generating an error if said kernel to be launched on said graphics processor from said graphics processor is not a launchable function.

* * * * *